US007766030B2

(12) United States Patent
Askew

(10) Patent No.: US 7,766,030 B2
(45) Date of Patent: Aug. 3, 2010

(54) HIGH PRESSURE TRANSDUCER

(75) Inventor: Andy R. Askew, Pfafftown, NC (US)

(73) Assignee: Fairchild Industrial Products Company, Winston-Salem, NC (US)

( * ) Notice: Subject to any disclaimer, the term of this patent is extended or adjusted under 35 U.S.C. 154(b) by 0 days.

(21) Appl. No.: 11/879,838

(22) Filed: Jul. 19, 2007

(65) Prior Publication Data

US 2008/0023073 A1 Jan. 31, 2008

Related U.S. Application Data

(60) Provisional application No. 60/832,052, filed on Jul. 20, 2006.

(51) Int. Cl.
*G05D 16/20* (2006.01)

(52) U.S. Cl. ...................... 137/85; 137/485; 137/487.5; 137/488

(58) Field of Classification Search ................... 137/85, 137/485, 487.5, 488, 489, 492.5
See application file for complete search history.

(56) References Cited

U.S. PATENT DOCUMENTS

| | | | | |
|---|---|---|---|---|
| 2,736,337 | A * | 2/1956 | Parks et al. | 137/492.5 |
| 3,890,992 | A * | 6/1975 | Wolz et al. | 137/14 |
| 4,519,254 | A | 5/1985 | Sonderegger et al. | |
| 4,559,821 | A | 12/1985 | Engeler et al. | |
| 4,649,754 | A | 3/1987 | Zacharias | |
| 4,679,438 | A | 7/1987 | Wareham | |
| 4,735,091 | A | 4/1988 | Engeler et al. | |
| 4,819,487 | A | 4/1989 | Wareham | |
| 4,982,608 | A | 1/1991 | Marki et al. | |
| 5,329,819 | A | 7/1994 | Park et al. | |
| 5,460,196 | A * | 10/1995 | Yonnet | 137/12 |
| 5,520,206 | A * | 5/1996 | Deville | 137/12 |
| 5,586,575 | A * | 12/1996 | Bergamini et al. | 137/488 |
| 5,615,832 | A * | 4/1997 | Price | 239/8 |
| 5,660,198 | A * | 8/1997 | McClaran | 137/12 |
| 5,758,686 | A * | 6/1998 | Ohtsuka et al. | 137/492.5 |
| 5,931,186 | A * | 8/1999 | Skoglund | 137/486 |
| 6,171,066 | B1 * | 1/2001 | Irokawa et al. | 417/44.2 |

(Continued)

OTHER PUBLICATIONS

International Search Report PCT/US07/16350 dated Jun. 10, 2008.

*Primary Examiner*—Stephen Hepperle
*Assistant Examiner*—William McCalister
(74) *Attorney, Agent, or Firm*—Kilpatrick Stockton LLP

(57) ABSTRACT

A high pressure transducer is disclosed. The transducer includes a supply inlet configured to provide a gas supply to the high pressure transducer at a supply pressure and a pressure divider section coupled to the supply inlet. The pressure divider section is configured to reduce the supply pressure to a reduced pressure as a function of a first predetermined ratio. The transducer also includes a low pressure control section coupled to the pressure divider section and configured to receiving the gas supply at the reduced pressure and an amplifying section coupled to the low pressure control section. The low pressure control section varies the reduced pressure to produce a variable control pressure to actuate the amplifying section in response thereto. The amplifying section is also configured to multiply the variable control pressure as a function of a second ratio to obtain an output pressure. Further, the transducer includes a main supply valve coupled to the amplifying section, wherein the amplifying section controls the main supply valve.

8 Claims, 5 Drawing Sheets

U.S. PATENT DOCUMENTS 6,584,999 B2 * 7/2003 Inayama et al. .......... 137/487.5
6,779,541 B2 * 8/2004 Inayama et al. ............. 137/102
6,832,628 B2 * 12/2004 Thordarson et al. ......... 137/613

* cited by examiner

HIGH PRESSURE TRANSDUCER

CROSS REFERENCE TO RELATED APPLICATION

The present application claims a benefit of priority to U.S. Provisional Application Ser. No. 60/832,052 filed on Jul. 20, 2006 entitled "High Pressure Transducer," the entire contents of which is being incorporated by reference herein.

BACKGROUND

1. Field

The present disclosure relates generally to pressure transducers, more specifically to highly responsive gas transducers capable of operating under high pressures.

2. Description of the Related Art

Pressure transducers have advanced significantly in the past few decades driven in part by their demand in machine and process industries. As high performance electronic control interfaces replaced manual pneumatic control interfaces, which required manual inputs to change transducer settings, the demand for high pressure transducers continued to grow accordingly. Although the process industry is satisfied with signal pressures of no more than 30 PSIG, continued drive in automation of the machine industry fueled the demand for pressure transducers capable of operating under much higher pressures. In the machine industry, typical source pressures can reach up to 150 PSIG, with some transducer designs operating above that threshold. Currently, the machine industry is utilizing pressures over 500 PSIG to perform specific operations, further driving the need for transducers capable of controlling such high pressures. Unlike in the lower pressure transducer segment, selection of transducers to fill the demand for such high pressure needs is very limited. Transducers well-suited for this task are required to be highly accurate, responsive as well as stable.

The current state of the art is an electro-pneumatic transducer. A challenging aspect of designing such transducers for high pressure operation is the primary electro-mechanical converting system. This section is responsible for converting the electrical input control signal into a pressure signal through the use of an electro-mechanical converting element. The electro-mechanical system actuates a pressure control system which allows for the flow of control gas. Conventional transducers utilize electro-magnetism and/or piezoelectric elements in the electro-mechanical converting system.

Conventional pressure control systems utilize high gain pneumatic flapper nozzle valve in either variable orifice or fixed orifice configurations. Traditional flapper nozzle valve technology is not viable due to high gas consumption. Attempts to limit gas consumption resulted in the need for smaller orifices and nozzle sizes, which require sophisticated filtering to prevent clogging. Thus, there is a need for efficient transducers having high response rates under high pressure conditions.

SUMMARY

The present disclosure provides a high pressure transducer which overcomes the shortcomings of conventional high pressure transducers, namely slow response time and high gas consumption. The pressure transducer according to the present disclosure includes a low pressure control section adapted for receiving a low pressure source from a pressure divider section. The low pressure control section includes a plurality of proportional solenoid valves for generating a variable control pressure in response to a control signal. An output amplifying section is also provided, which includes a plurality of area ratio pistons to amplify the variable control pressure signal to achieve desired high output pressure. The pressure transducer also includes a pressure sensor and a feedback circuit for controlling the low pressure control section and the pressure amplifier to prevent detrimental effects of high friction therein.

According to one aspect of the present disclosure, a high pressure transducer is disclosed. The transducer includes a supply inlet configured to provide a gas supply to the high pressure transducer at a supply pressure and a pressure divider section coupled to the supply inlet. The pressure divider section is configured to reduce the supply pressure to a reduced pressure as a function of a first predetermined ratio. The transducer also includes a low pressure control section coupled to the pressure divider section and configured for receiving the gas supply at the reduced pressure and an amplifying section coupled to the low pressure control section. The low pressure control section is configured to vary the reduced pressure to obtain a variable control pressure which actuates the amplifying section. The amplifying section is also configured to multiply the variable control pressure as a function of a second ratio to obtain an output pressure. Further, the transducer includes a main supply valve coupled to the amplifying section, wherein the amplifying section controls the main supply valve.

A method for controlling a high pressure transducer is also contemplated by the present disclosure. The method includes the steps of providing a gas supply at a supply pressure through a supply inlet to the high pressure transducer, receiving the gas supply at a pressure divider section coupled to the supply inlet and reducing the supply pressure to a reduced pressure as a function of a first predetermined ratio. The method also includes the steps of supplying a low pressure control section which is coupled to the pressure divider section with the gas supply at the reduced pressure, wherein the low pressure control section varies the reduced pressure to obtain a variable control pressure output and transporting the variable control pressure output of the low pressure control section to an amplifying section which is coupled to the low pressure control section to actuate the amplifying section. The method further includes the steps of multiplying the variable control pressure as a function of a second ratio to obtain an output pressure and outputting the gas supply at the output pressure through a main supply valve coupled to the amplifying section, wherein the amplifying section controls the main supply valve.

According to another aspect of the present disclosure, a high pressure transducer is disclosed. The transducer has a supply inlet configured to provide a gas supply to the high pressure transducer at a supply pressure and a pressure divider section coupled to the supply inlet and including a ratio piston assembly having a small ratio piston and a large ratio piston. The pressure divider section is configured to reduce the supply pressure to a reduced pressure as a function of the ratio of the small and large ratio pistons The transducer also includes a low pressure control section coupled to the pressure divider section and configured for receiving the gas supply at the reduced pressure and an amplifying section coupled to the low pressure control section. The low pressure control section is configured to vary the reduced pressure to obtain a variable control pressure which actuates the amplifying section. The amplifying section includes a multiplying ratio piston assembly configured to multiply the variable control pressure as a function of the ratio of the multiplying ratio piston assembly to obtain an output pressure. The transducer also includes a main supply valve coupled to the amplifying section, wherein the amplifying section controls the main supply valve.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Particular embodiments of the present disclosure will be described herein below with reference to the accompanying drawings. In the following description, well-known functions or constructions are not described in detail to avoid obscuring the present disclosure in unnecessary detail.

Figure 1:
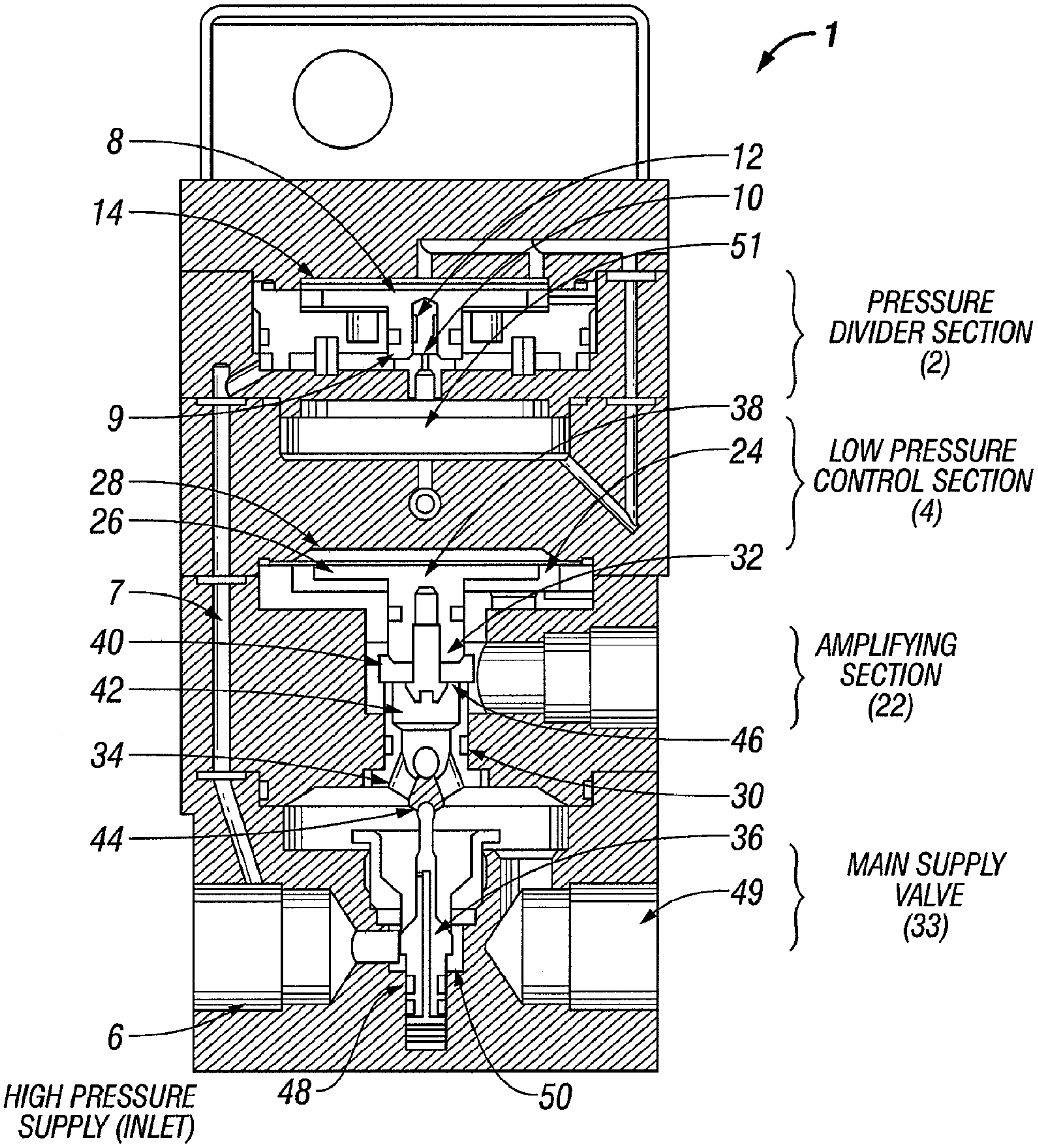
FIG. 1 is a side cross-sectional view of a high pressure transducer according to the present disclosure.
Figure 2:
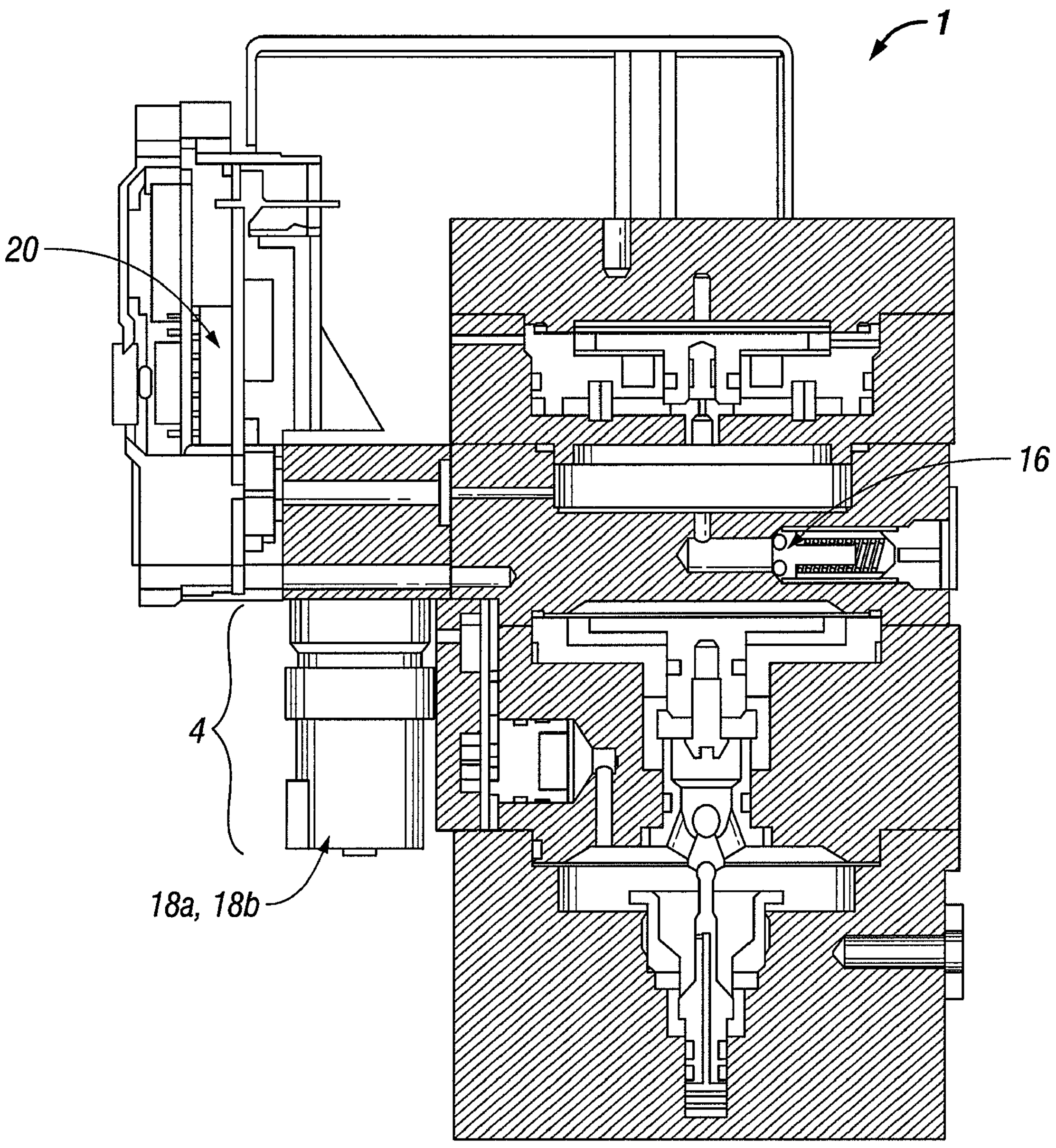
FIG. 2 is a front cross-sectional view of a high pressure transducer according to the present disclosure.

FIGS. 1 and 2 show a high pressure transducer 1 for controlling flow of a gas. The pressure transducer 1 includes a pressure divider section 2, a low pressure control section 4, an amplifying section 22, and a main supply valve 36. The pressure divider section 2 reduces supply pressure of the gas by a predetermined ratio to a reduced pressure. The reduced pressure gas then operates the low pressure control section 4 which varies the reduced pressure to obtain variable control pressure to actuate the amplifying section 22. More specifically, the low pressure control section 4 includes feed-and-bleed solenoid valves 18*a* and 18*b* (FIGS. 2 and 3) as the primary electro-pneumatic conversion mechanism which produces the variable control pressure.

The amplifying section 22 amplifies the variable control pressure by an inverse of the predetermined ratio to restore the gas pressure substantially to the original supply pressure to control the main supply valve 36. The amplifying section 22 includes a multiplying ratio piston assembly 38 having one or more area ratio pistons 26 which amplify the variable control pressure of the low pressure control section 4 to achieve the high output pressure range. A high accuracy pressure sensor and electronic feedback control circuit 100, which is shown in more detail in FIG. 5, prevents detrimental effects of high friction on components of the multiplying ratio piston assembly 38 by controlling the transducer 1 using a closed control loop. Thus, the main supply valve 36 is actuated using gas having a pressure lower than the supply pressure thereby reducing the demands on the low pressure control section 4 and increasing the response time thereof.

The transducer 1 includes a high pressure supply inlet 6 and an outlet 49. The supplied gas may be any type of gas suitable for operation of the transducer 1 such as air, nitrogen, oxygen, carbon dioxide, etc. The supply inlet 6 includes a gas supply conduit 7 which provides the gas into the pressure divider section 2, which then supplies the low pressure control section 4 with the gas at a reduced pressure. The pressure divider section 2 reduces the high supply pressure by a predetermined ratio (e.g., ⅛), which is an inverse of the ratio (e.g., 8) used by the amplifying section 22 to convert the variable control pressure gas into high output pressure substantially equal to the supply pressure.

The pressure divider section 2 includes a ratio piston assembly 8 having one or more pneumatic pistons (e.g., a lower small area piston 9 and an upper large area piston 14) and a flapper nozzle valve 10. The pressure divider section 2 employs force balance principals and opposing area ratios of the lower small area piston 9 and an upper large area piston 14 to control the outlet pressure of the flapper nozzle valve 10. The gas supplied to the pressure divider section 2 is provided to the lower small area piston 9 which then actuates the flapper nozzle valve 10.

The output of the flapper nozzle valve 10 provides a feedback signal, the reduced pressure gas, which is applied to the upper large area piston 14 thereby balancing the force produced by the supply pressure acting on the lower small area piston 9 and modulating the flapper nozzle about a reduced pressure gas. The flapper nozzle valve 10 modulates the supply pressure as a function of the supply pressure divided by the area ratio of the pistons 9 and 14 of the ratio piston assembly 8. In other words, the supply pressure of the gas is reduced by a predetermined ratio which is defined by the relationship between the lower small area piston 9 and an upper large area piston 14.

The flapper nozzle valve 10 also includes a flapper column 12 which functions as a force limiter and a seal for flapper nozzle valve 10. The flapper column 12 may be formed from an elastic polymer or an elastomer. In the event of a sudden supply pressure loss, the balancing force on the ratio piston assembly 8 is lost and the full force of the large area piston 14 is applied against the flapper nozzle valve 10. The spring action of the polymer flapper column 12 compresses thereby allowing the lower small area piston 9 to rest against a non-critical portion of the flapper nozzle valve 10 and protecting the seal face of the flapper column 12 from damage.

The output of the pressure divider section 2 also includes an integral surge volume chamber 51 for the solenoid valves 18*a* and 18*b* and a safety relief valve 16 which protect the low pressure control section 4 from high pressure in the event of a failure of the pressure divider section 2. If the pressure divider 2 fails, or if excessively high supply pressure is applied to the transducer 1, the safety relief valve 16 limits the pressure applied to the sensitive low pressure control section 4.

Figure 3:
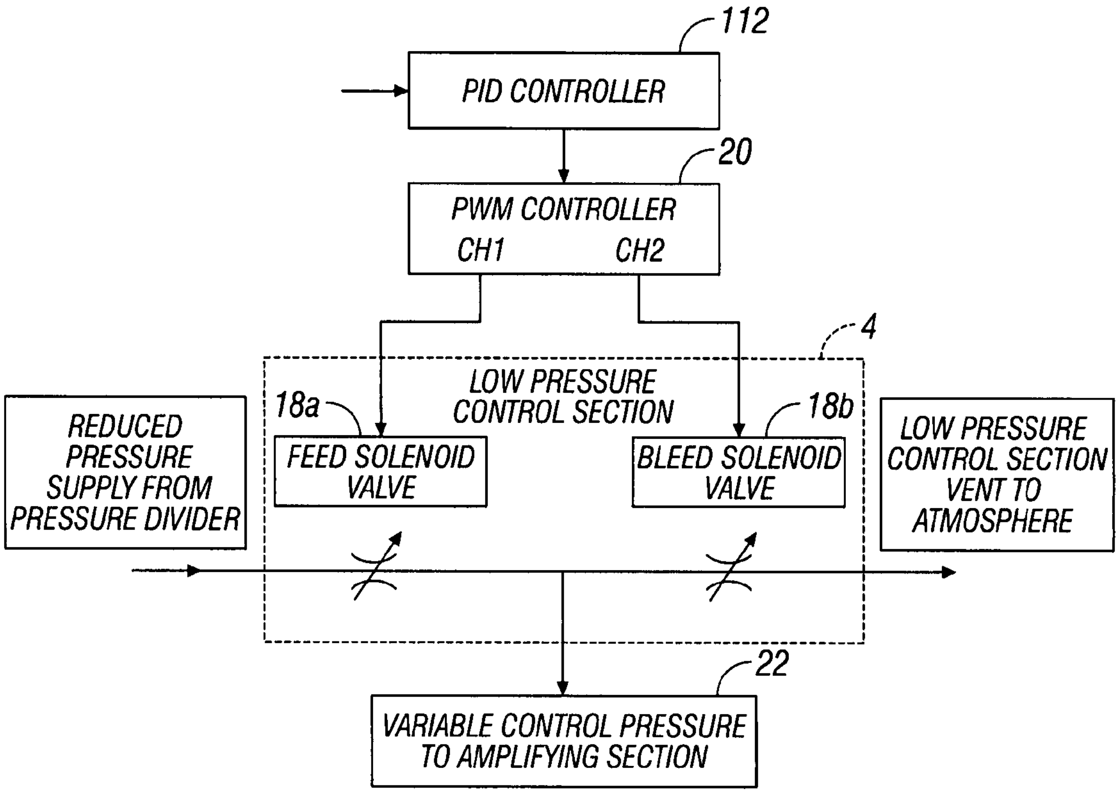
FIG. 3 is a schematic diagram of a low pressure control section of the high pressure transducer of FIG. 1.

With reference to FIG. 3, the low pressure control section 4 includes two, quick response, low capacity, solenoid valves 18*a* and 18*b* (e.g., the feed solenoid valve 18*a* and the bleed solenoid valve 18*b*) controlled by a digital electronic pulse width modulated ("PWM") controller 20, which receives control signals from a proportional-integral-derivative ("PID") controller 112. The PWM controller 20 and the PID controller 112 are components of the control circuit 100 which is shown in more detail in FIG. 5.

The PWM controller 20 varies the current supplied to the solenoid valves 18*a* and 18*b* thereby controlling the pressure in the low pressure side 28 of the amplifying section 22. The feed solenoid valve 18*a* receives the reduced pressure gas, and admits gas to the low pressure side 28 of the amplifying section 22, whereas the bleed solenoid valve 18*b* withdraws the gas from the low pressure side 28. When in the closed configuration, the solenoid valves 18 facilitate a so-called "lock in last place" failure mode in the event of power loss.

The feed solenoid valve 18*a* and the bleed solenoid valve 18*b* are connected in series forming a network with two variable restrictions. Supply pressure enters at supply end of the network, which is the feed solenoid valve 18*a*, and outlet end of the network, which is the bleed solenoid valve 18*b*, is open to atmosphere. The variable restriction is effected by manipulating the solenoid valves with pulse width modulated control thereby creating a variable restriction as the PWM duty cycle changes from 0 to 100%.

Figure 4:
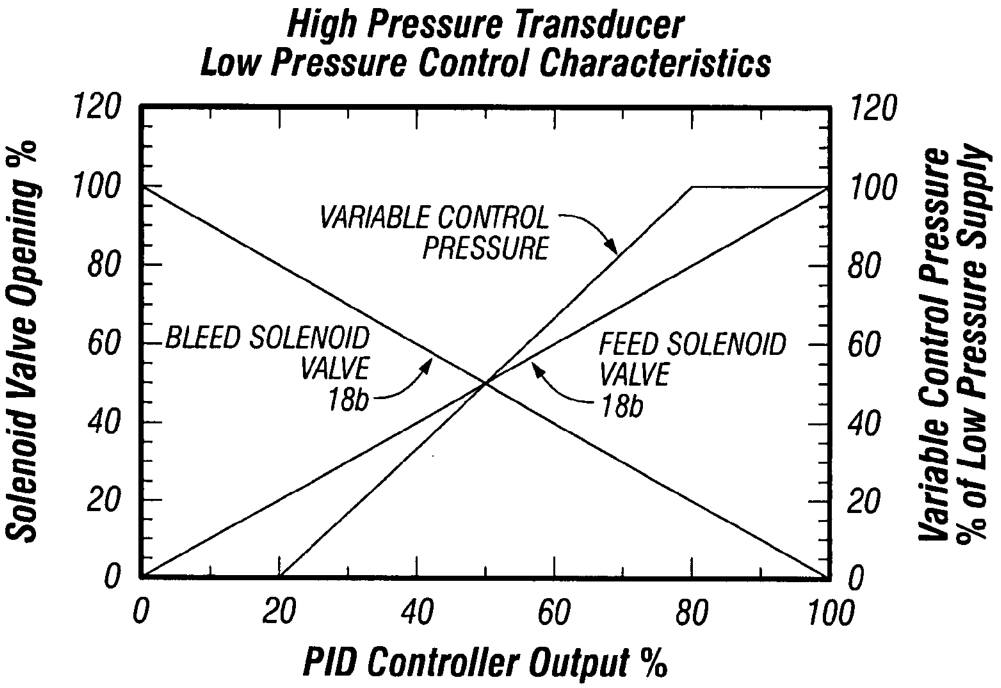
FIG. 4 is a graph illustrating pressure changes within the low pressure control section according to the present disclosure.

The PWM signals controlling the two solenoid valves are complementary to each other, such that when one solenoid valve is at 80% duty cycle, the other is at 20%; when one solenoid valve is at 40% the other valve is at 60%, etc. The PWM control of the feed solenoid valve 18*a* is directly related to the output of the PID controller 112 where the bleed solenoid valve is inversely related or complementary to the output of the PID controller 112. As the PID controller 112 traverses from 0 to 100% output, the feed solenoid valve 18*a* control traverses from 0 to 100% and the bleed solenoid valve 18*b* traverses from 100 to 0%. As this occurs, the pressure present between the two solenoid valves 18*a* and 18*b* traverses from zero pressure to full supply pressure and effectively changes the electrical signal output of the PID controller 112 into a pneumatic signal output as shown in FIG. 4. This configuration provides the primary electric-to-mechanical conversion function within the transducer 1 by generating the variable control pressure. While the pressure output does not track exactly from 0 to 100% with the output of the PID controller 112, gains and offsets within the PID controller 112 compensate for the mismatch.

Referring back to FIGS. 1 and 2, the amplifying section 22 includes a low pressure side 28 which receives the variable control pressure from the low pressure control section 4 and a high pressure side 34, which outputs amplified gas. The amplifying section 22 also includes a diaphragm actuator 24 on the low pressure side 28. The diaphragm actuator 24 is coupled with a sliding o-ring seal 30 and an exhaust sleeve 42 on a high pressure side 34 to generate the area ratio needed to multiply the pressure of the low pressure control section 4. The area ratio is substantially the inverse of the area ratio between the pistons 9 and 14 of the piston assembly 8, such that the gas pressure is restored to the original input gas pressure. In embodiments, the diaphragm actuator 24 is configured to operate at pressures of up to about 300 PSI and the sliding o-ring seal 30 is configured to operate at pressures of up to about 1,500 PSI.

The amplifying section also includes a multiplying ratio piston assembly 38 which actuates the main supply valve 36 allowing the supplied gas from the inlet 6 to flow through the transducer 1 to the output 49. The ratio piston assembly 38 includes an area ratio piston 26, an exhaust valve sleeve 42 and an exhaust valve seat 46. The exhaust valve sleeve 42 incorporates a ball joint feature 44 which allows for the exhaust valve sleeve 42 to self-align with the valve seat 46 within the piston assembly 38.

The main supply valve 36 includes a sliding piston 48 disposed within a supply area 50 which pressure balances the main supply valve 36 with the supply pressure interposed therein and outlet pressure ported to chambers on either side the supply area 50. The exhaust valve 40 is also pressure balanced by employing an effective valve diameter which is substantially the same diameter as the exhaust sleeve's sliding seal 30.

Figure 5:
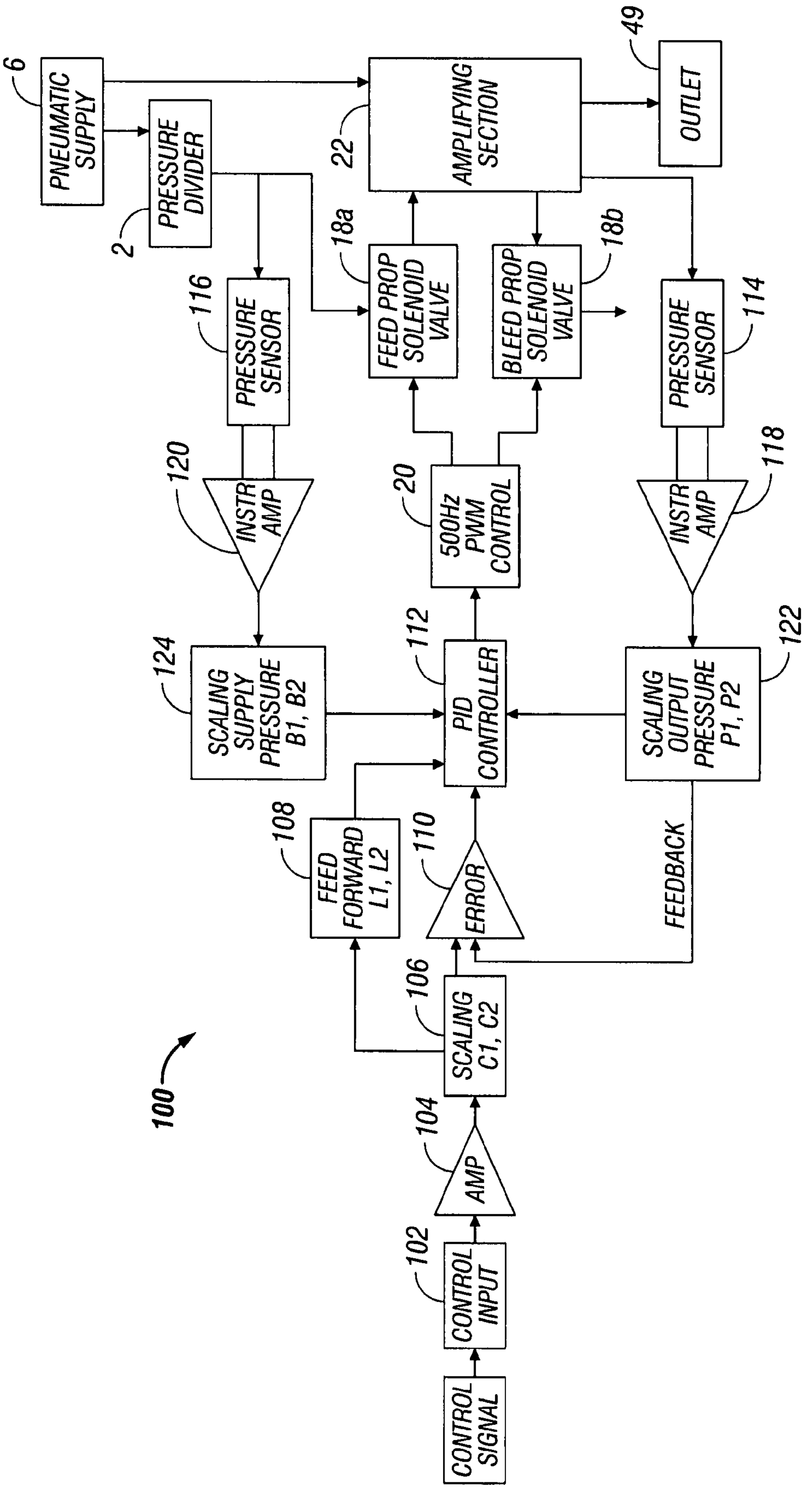
FIG. 5 is a schematic diagram of a control circuit for the high pressure transducer of FIG. 1.

FIG. 5 shows the control circuit 100 which includes a control input 102 such as an electrical control signal or manual input mechanism allowing for setting of desired output pressure for the transducer 1. The control input 102 transmits the control signals to an amplifier 104 to increase the power of the control signal. The amplified signal is thereafter scaled by a scaling circuit 106 and branches to both the error amplifier 110 and feed forward circuit 108 to the PID controller 112. The PID controller 112 generates an output to the PWM controller 20 based on the error between a measured process variable and the desired control signal. The PID controller 112 calculates and then outputs a corrective action that adjusts the control output response based upon three parameters: proportional, integral, and derivative.

The PID controller 112 processes the error signal and transmits the processed signal to the PWM controller 20 which then controls the solenoid valves 18*a* and 18*b* as discussed above with respect to FIG. 3. The solenoid valve 18*a* is a feed valve, wherein the solenoid valve 18*b* is a bleed valve. The feed valve 18*a* is supplied by the low pressure gas from the pressure divider 2. The feed valve 18*a* thereafter controls the amplifying section 22 to generate a desired output.

A pressure sensor 116 monitors the pressure in the pressure divider section 2 and a pressure sensor 114 monitors the output pressure at the outlet 49 in the main supply valve 33. The pressure signals are transmitted to respective amplifiers 118 and 120 and scaling circuits 122 and 124 prior to being passed to the PID controller 112 for processing. The PID controller 112 compares the measured pressures within the pressure divider section 2 and the outlet pressure with corresponding control signal and based on the deviation from the control signal controls the PWM controller 20 to adjust the solenoid valves 18*a* and 18*b*. This allows the solenoid valves 18*a* and 18*b* to match the output pressure to the desired output pressure derived from the control signal.

Figure 6:
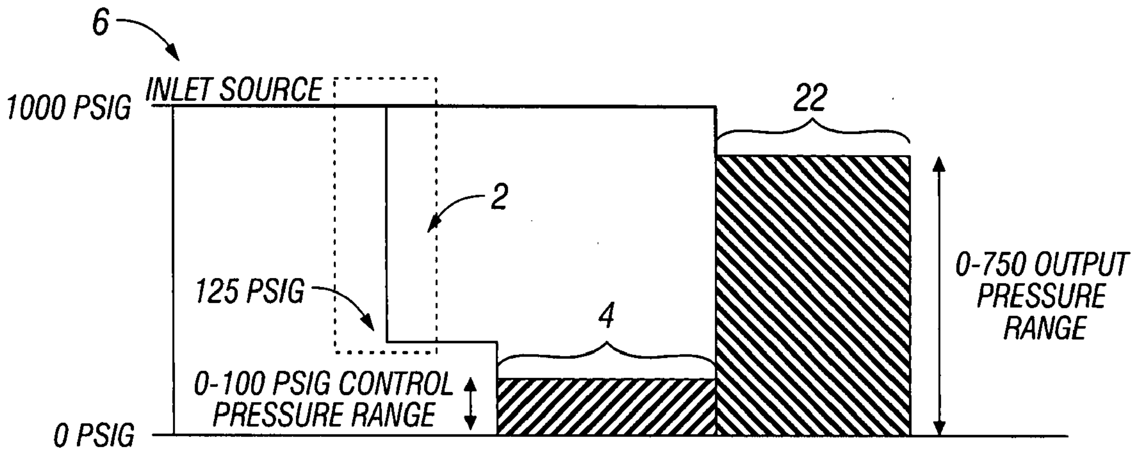
FIG. 6 is a schematic diagram of a pressure path through the high pressure transducer of FIG. 1.

FIG. 6 illustrates the pressure changes within the transducer 1. In the embodiment, the supply pressure of the gas supplied to the transducer 1 is 1000 PSI. The gas supply is divided by the pressure divider 2, resulting in the reduced pressure of 125 PSI, which is approximately $1/8^{th}$ of the original supply pressure. The pressure is reduced as a function of the ratio of the pistons 9 and 14 of the piston assembly 8 within the pressure divider. The reduced pressure is supplied to the low pressure control section 4, which operates within a pressure range from about 0 PSI to about 100 PSI for the given supply of reduced pressure. The low pressure control section 4 then uses the reduced pressure to produce a variable control pressure. The variable control pressure controls the amplifying section 22 which outputs gas at an output pressure from about 0 PSI to about 750 PSI as the amplifying section 22 actuates the main supply valve 33. As seen in the diagram of FIG. 6, the resulting output pressure is substantially equal to the supply pressure, although the supply pressure is initially reduced to the reduced pressure, varied, and thereafter amplified to achieve the desired output pressure.

Figure 7:
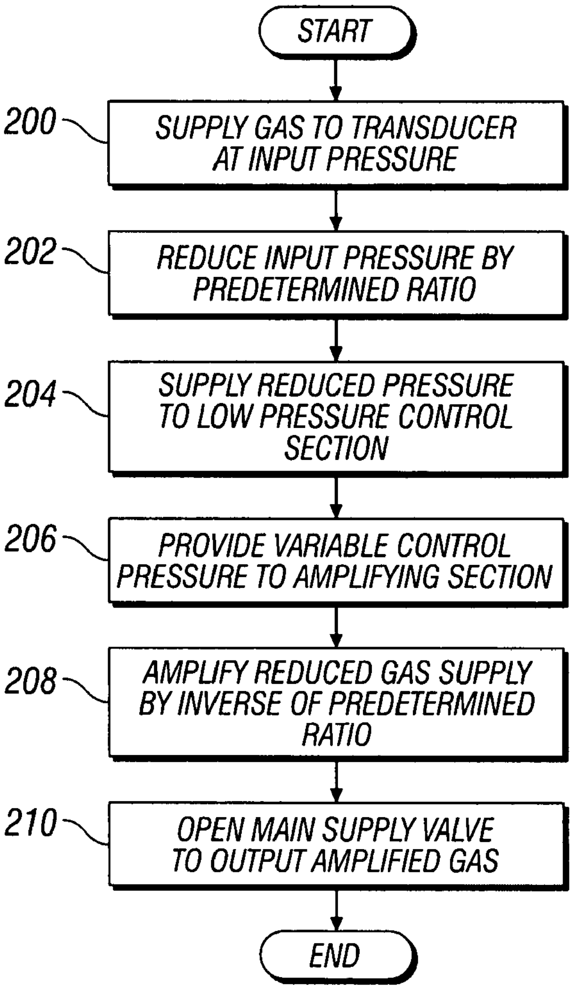
FIG. 7 is a flow chart illustrating a method for controlling the high pressure transducer of FIG. 1.

FIG. 7 illustrates a method for controlling the pressure transducer 1. In step 200, the gas is supplied to the transducer 1 through the supply inlet 6. A portion of the gas supply is directed to the pressure divider section 2, wherein in step 202, the original supply pressure is reduced by a predetermined ratio as dictated by the area ratio between the pistons 9 and 14 of the ratio piston assembly 8. In step 204, the gas at the reduced pressure is supplied to the low pressure control section 4. In step 206, the feed and bleed solenoid valves 18 and 18*b* control the amplifying section 22 by varying the reduced pressure gas producing a variable control pressure. The variable control pressure gas is amplified in step 208 by the amplifying section 22 by the inverse of the predetermined ratio to restore the variable control pressure gas to substantially the original supply pressure. In step 210, the main supply valve 36 is opened to output the amplified gas through the outlet 49.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A high pressure transducer comprising:

a supply inlet configured to provide a gas supply to the high pressure transducer at a variable supply pressure, wherein the variable supply pressure is greater than or equal to 750PSI;

a pressure divider section comprising a ratio piston assembly having a lower small area piston and an upper large area piston, coupled to the supply inlet and configured to reduce the variable supply pressure, by a fixed ratio equal to a ratio of the diameter of the lower small area piston to the diameter of the upper large area piston, and wherein the reduced pressure is variable, proportional to the variable supply pressure, and less than or equal to 200PSI;

a low pressure control section coupled to the pressure divider section, the low pressure control section comprising at least one pair of feed and bleed valves, the low pressure control section configured to receive the reduced pressure gas from the pressure divider section and to vary the pressure to produce a variable control pressure;

an amplifying section coupled to the low pressure control section and coupled to a main supply valve, wherein the low pressure control section actuates the amplifying section in response to the variable control pressure, the amplifying section configured to control the main supply valve to produce an output pressure that is a multiple of the variable control pressure by modulating the variable input pressure applied to the main supply valve; and an electrical feedback control circuit having a first pressure sensor for monitoring pressure in the pressure divider section and a second pressure sensor for monitoring output pressure in the amplifying section, the feedback control circuit configured to control the low pressure control section as a function of the pressure in the pressure divider section, the pressure in the amplifying section, and a control signal.

2. A high pressure transducer according to claim 1, wherein the amplifying section comprises a multiplying ratio piston assembly configured to modulate the output pressure of the supply valve based on the variable control pressure.

3. A high pressure transducer according to claim 1, wherein the pressure divider section comprises a flapper nozzle valve configured to control output of the pressure divider section.

4. A high pressure transducer according to claim 3, wherein the flapper nozzle valve comprises a flapper column configured to act as a force limiter.

5. A high pressure transducer according to claim 1, wherein the electrical feedback control circuit further comprises a pulse width modulated controller which controls the low pressure control section as a function of at least one of the pressure in the pressure divider section, pressure in the amplifying section, and a control signal.

6. A method for controlling a high pressure transducer, comprising the steps of:

providing a gas supply at a variable supply pressure through a supply inlet to the high pressure transducer, wherein the variable supply pressure is greater than or equal to 750PSI;

receiving the gas supply at a pressure divider section coupled to the supply inlet, the pressure divider section comprising a ratio piston assembly having a lower small area piston and an upper large area piston, the pressure divider section configured to reduce the variable supply pressure by a fixed ratio equal to the ratio of the diameter of the lower small area piston to the diameter of the upper large area piston, and wherein the reduced pressure is variable, proportional to the variable supply pressure, and less than or equal to 200PSI;

supplying a low pressure control section which is coupled to the pressure divider section with the reduced pressure gas, wherein the low pressure control section comprises at least one pair of feed and bleed valves configured to receive the low pressure gas from the pressure divider and to vary the reduced pressure to produce a variable control pressure output;

transporting the variable control pressure output of the low pressure control section to an amplifying section which is coupled to the low pressure control section and coupled to a main supply valve, the amplifying section configured to be actuated by the low pressure control section in response to the variable control pressure;

controlling the main supply valve to produce an output pressure through the main supply valve that is a multiple of the variable control pressure, by modulating the variable input pressure applied to the main supply valve, wherein the amplifying section controls the main supply valve;

receiving, by a control circuit, a first sensor signal from a first pressure sensor configured to monitor the pressure in the pressure divider section;

receiving, by the control circuit, a second sensor signal from a second pressure sensor configured to monitor the pressure in the amplifying section;

determining, by the control circuit, control signals configured to control the feed and bleed valves based at least in part on the first and second sensor signals; and transmitting, by the control circuit, the control signals to the feed and bleed valves.

7. A method according to claim 6, wherein the amplifying section of the transporting step comprises a multiplying ratio piston assembly configured to modulate the output pressure of the supply valve based on the variable control pressure.

8. A high pressure transducer comprising:

a supply inlet configured to provide a gas supply to the high pressure transducer at a variable supply pressure, wherein the variable supply pressure is greater than or equal to 750PSI;

a pressure divider section comprising a ratio piston assembly having a lower small area piston and an upper large area piston, coupled to the supply inlet and configured to reduce the variable supply pressure by a fixed ratio equal to a ratio of the diameter of the lower small area piston to the diameter of the upper large area piston, and wherein the reduced pressure is variable, proportional to the variable supply pressure, and less than or equal to 200PSI;

a low pressure control section coupled to the pressure divider section, the low pressure control section comprising at least one pair of feed and bleed valves, the low pressure control section configured to receive the reduced pressure gas from the pressure divider section and to vary the pressure to produce a variable control pressure;

an amplifying section coupled to the low pressure control section and coupled to a main supply valve, wherein the low pressure control section actuates the amplifying section in response to the variable control pressure, the amplifying section configured to control the main supply valve to produce an output pressure that is a multiple of the variable control pressure by modulating the variable input pressure applied to the main supply valve; and an electrical feedback control circuit configured to:

receive a first sensor signal from a first pressure sensor configured to monitor the pressure in the pressure divider section, receive a second sensor signal from a second pressure sensor configured to monitor the pressure in the amplifying section, and activate the feed and bleed valves to control the pressure in the low pressure control section and the output pressure of the main supply valve, based at least in part on the first sensor signal and the second sensor signal.

* * * * *

UNITED STATES PATENT AND TRADEMARK OFFICE

CERTIFICATE OF CORRECTION

PATENT NO. : 7,766,030 B2
APPLICATION NO. : 11/879838
DATED : August 3, 2010
INVENTOR(S) : Andrew R. Askew It is certified that error appears in the above-identified patent and that said Letters Patent is hereby corrected as shown below:

Column 6, line 62, After “solenoid valves”, please delete “18”, and insert -- 18a --.

Signed and Sealed this

Thirtieth Day of November, 2010

David J. Kappos
*Director of the United States Patent and Trademark Office*